US012726485B2

(12) United States Patent

Merricks et al.

(10) Patent No.: US 12,726,485 B2

(45) Date of Patent: Sep. 1, 2026

(54) SYSTEMS AND TECHNIQUES FOR SMART DEMAND SIDE RESPONSE USING DATA PLANE ARCHITECTURE

(71) Applicant: Landis+Gyr AG, Cham (CH)

(72) Inventors: Nicholas P. Merricks, Bourne (GB); Daire Kelly, Bath (GB); Ross Catley, Tingewick (GB)

(73) Assignee: Landis+Gyr AG, Cham (CH)

( * ) Notice: Subject to any disclaimer, the term of this patent is extended or adjusted under 35 U.S.C. 154(b) by 403 days.

(21) Appl. No.: 17/724,726

(22) Filed: Apr. 20, 2022

(65) Prior Publication Data

US 2022/0337599 A1 Oct. 20, 2022

Related U.S. Application Data

(60) Provisional application No. 63/177,291, filed on Apr. 20, 2021.

(51) Int. Cl.

*H04L 9/40* (2022.01)
*B60L 55/00* (2019.01)
*H04L 9/00* (2022.01)

(52) U.S. Cl.

CPC .............. *H04L 63/12* (2013.01); *B60L 55/00* (2019.02); *H04L 9/50* (2022.05); *H04L 63/102* (2013.01); *H04L 63/20* (2013.01)

(58) Field of Classification Search

CPC ......... H04L 63/12; H04L 9/50; H04L 63/102; H04L 63/20

See application file for complete search history.

(56) References Cited

U.S. PATENT DOCUMENTS 9,830,472 B2 * 11/2017 Burckard ............ H04L 63/0435
11,927,609 B2 * 3/2024 Song .................. G01R 19/2513

(Continued)

FOREIGN PATENT DOCUMENTS

CN 110598434 A 12/2019
CN 110754072 A 2/2020

(Continued)

OTHER PUBLICATIONS

Li et al., "Blockchain-Based Anomaly Detection of Electricity Consumption in Smart Grids", Pattern Recognition Letters, vol. 138, Oct. 2020, pp. 476-482.

(Continued)

*Primary Examiner* — Harris C Wang

(74) *Attorney, Agent, or Firm* — Kilpatrick Townsend & Stockton LLP

(57) ABSTRACT

A system includes a processor and a non-transitory, computer-readable memory that includes instructions executable by the processor for causing the processor to perform operations. The operations include accessing data communications associated with energy consumption from premises data sources located at a premises. Additionally, the operations include generating a premises data set using the data communications associated with the energy consumption and wrapping the premises data set with a set of permissions using a privacy management operation. Further, the operations include receiving a request from an entity to access the premises data set and determining that the entity is permitted to access the premises data set based on the set of permissions. Moreover, the operations include providing the premises data set to the entity.

19 Claims, 12 Drawing Sheets

(56) References Cited

U.S. PATENT DOCUMENTS

| | | | | |
|---|---|---|---|---|
| 2012/0173252 | A1* | 7/2012 | Mak | H02J 3/008 709/224 |
| 2014/0068257 | A1* | 3/2014 | Burckard | G06Q 50/06 713/166 |
| 2014/0269535 | A1* | 9/2014 | Pazhyannur | H04W 40/24 370/329 |
| 2014/0277788 | A1* | 9/2014 | Forbes, Jr. | G05F 1/66 700/286 |
| 2017/0371308 | A1* | 12/2017 | Ghosh | G05B 15/02 |
| 2018/0330250 | A1* | 11/2018 | Nakayama | H02J 13/1323 |
| 2021/0357951 | A1* | 11/2021 | Oberle | G06F 40/284 |
| 2022/0337599 | A1* | 10/2022 | Merricks | H04L 9/50 |
| 2025/0309656 | A1* | 10/2025 | Ashman | H02J 3/381 |

FOREIGN PATENT DOCUMENTS

| | | | |
|---|---|---|---|
| CN | 111062807 | A | 4/2020 |
| CN | 111583526 | A | 8/2020 |
| CN | 112511503 | A | 3/2021 |
| JP | 6860108 | B1 | 4/2021 |
| WO | 2012/066651 | A1 | 5/2012 |
| WO | 2019/215437 | A1 | 11/2019 |

OTHER PUBLICATIONS

Nguyen et al., "Blockchain for 5G and Beyond Networks: A State of the Art Survey", Cornell University, Dec. 11, 2019, pp. 1-45.

PCT/IB2022/053696, International Search Report and Written Opinion, Jul. 4, 2022, 13 pages.

Sciume et al., "Demand Response Service Certification and Customer Baseline Evaluation Using Blockchain Technology", IEEE Access, vol. 8, Jul. 2020, pp. 139313-139331.

Office Action, Chinese Patent Application No. 202280041900.3, Apr. 15, 2026, 17 pages.

Office Action, Japanese Patent Application No. 2023-564235, May 19, 2026, 12 pages.

* cited by examiner

SYSTEMS AND TECHNIQUES FOR SMART DEMAND SIDE RESPONSE USING DATA PLANE ARCHITECTURE

CROSS-REFERENCE TO RELATED APPLICATIONS

The present disclosure claims priority to U.S. Provisional Application Ser. No. 63/177,291 for "SMART DEMAND SIDE RESPONSE: DATAPLANE ARCHITECTURE," filed Apr. 20, 2021, which is incorporated by reference herein in its entirety.

TECHNICAL FIELD

Implementations described herein relate to utility provision control and, more particularly, to systems and techniques for smart demand side response using a data plane architecture.

BACKGROUND

Generally, utility meters measure the consumption of a resource, such as electricity, water, or gas. Typically, a utility meter is installed at or near a premises to measure consumption on that premises. A utility meter is typically provided by a service provider, which manages the utility meter as needed to ensure that the utility meter is fully operational and that accurate consumption measurements are taken. In some cases, a utility meter has an integrated radio and thereby participates in a smart metering network. Through the smart metering network, the utility meter may report consumption and other information to a remote, centralized headend system that is in communication with and is responsible for services across a plurality of utility meters.

Demand side response (DSR) is one of many ways to adapt electricity systems, which include utility meters of the smart metering network, to renewable energy and increasing demand as key services such as transport and heating are electrified. DSR may face technical challenges with interoperability for device control in a competitive landscape, establishment of data security that is equivalent to security of a smart metering network, and an ability to cope with increasing quantities of data associated with DSR and system participants wanting to act upon that data. With a large quantity of data, maintaining consumer privacy associated with the data also presents a significant challenge. Further, reusing a smart metering network in a DSR system may present issues relating to scalability, maintenance of an end-to-end security model, a lack of trustless messaging, inability to provide data for certain purposes, inability to provide consumer data history and data, and inability to provide portability to support access to billed electricity at locations remote from a premises associated with a bill-payer.

SUMMARY

In one implementation, a system includes a processor and a non-transitory, computer-readable memory that includes instructions executable by the processor for causing the processor to perform operations. The operations include accessing data communications associated with energy consumption from premises data sources located at a premises. Additionally, the operations include generating a premises data set using the data communications associated with the energy consumption and wrapping the premises data set with a set of permissions using a privacy management operation. Further, the operations include receiving a request from an entity to access the premises data set and determining that the entity is permitted to access the premises data set based on the set of permissions. Moreover, the operations include providing the premises data set to the entity.

In another implementation, a non-transitory computer-readable medium may include instructions that are executable by a processor for causing the processor to perform operations. The operations include accessing data communications associated with energy consumption from premises data sources located at a premises. Additionally, the operations include generating a premises data set using the data communication associated with the energy consumption. The operations also include wrapping the premises data set with a set of permissions using a privacy management operation. Further, the operations include receiving a request from an entity to access the premises data set and determining that the entity is permitted to access the premises data set based on the set of permissions. The operations also includes providing the premises data set to the entity.

In yet another implementation, a computer-implemented method includes accessing, at a demand side response data plane, data communications associated with energy consumption from premises data sources located at a premises. The method also includes generating, at the demand side response data plane, a premises data set using the data communication associated with the energy consumption. Additionally, the method includes wrapping, at the demand side response data plane, the premises data set with a set of permissions using a privacy management operation. Further, the method includes receiving, at the demand side response data plane, a request from an entity to access the premises data set and determining, at the demand side response data plane, that the entity is permitted to access the premises data set based on the set of permissions. Moreover, the method includes providing, from the demand side response data plane, the premises data set to the entity.

These illustrative implementations are mentioned not to limit or define the disclosure, but to provide examples to aid understanding of the invention. Additional implementations are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings.

DETAILED DESCRIPTION

Several challenges exist in the current implementation of demand side response in electricity systems. Accordingly, a technical architecture that supports a shift to a smart grid will need to scale to support use cases present today and use cases that will be present in the future. In an example, using existing electricity systems, such as a point-to-point architecture, in a demand side response implementation may result in challenges of interoperability, scalability, and security. Given these challenges, a new architecture described herein that reuses, but builds upon, the smart metering network may address the challenges of the existing electricity systems in the demand side response implementation.

The architecture makes use of concepts from telephony networks to separate interoperability concerns and to provide a useful layered conceptual framework for considering demand side response interoperability. In an example, secure control of devices is separated from security and privacy management of data in an energy system control plane and an energy system data plane. The control plane may reuse the smart metering network to provide the benefits of communication reach of the smart metering network, while the data plane may overcome inherent issues of data access. For example, the data access may inherently be slow and cumbersome across a Wide Area Network, and the data may be stored for access in separate data silos such that accessing complete data presents a complex access problem across a wide range of energy industry organizations.

The architecture becomes scalable by gathering a home data set, or a data set associated with an individual premises or a set of premises associated with a billpayer, into a singular unit of data portability in the cloud and wrapping the home data set in a privacy and security management layer. Such an architecture may provide a secure and highly granular privacy model. Further, by enabling a powerful anomaly detection capability in a customer energy management device associated with the premises and creating a new energy management system, trustless security that underpins a smart metering security model can be maintained and enhanced across the smart grid. The energy management system may also provide a mechanism for using the energy system control plane as a demand side response control plane for use with centralized security monitoring and detailed whole network analysis.

Figure 1:
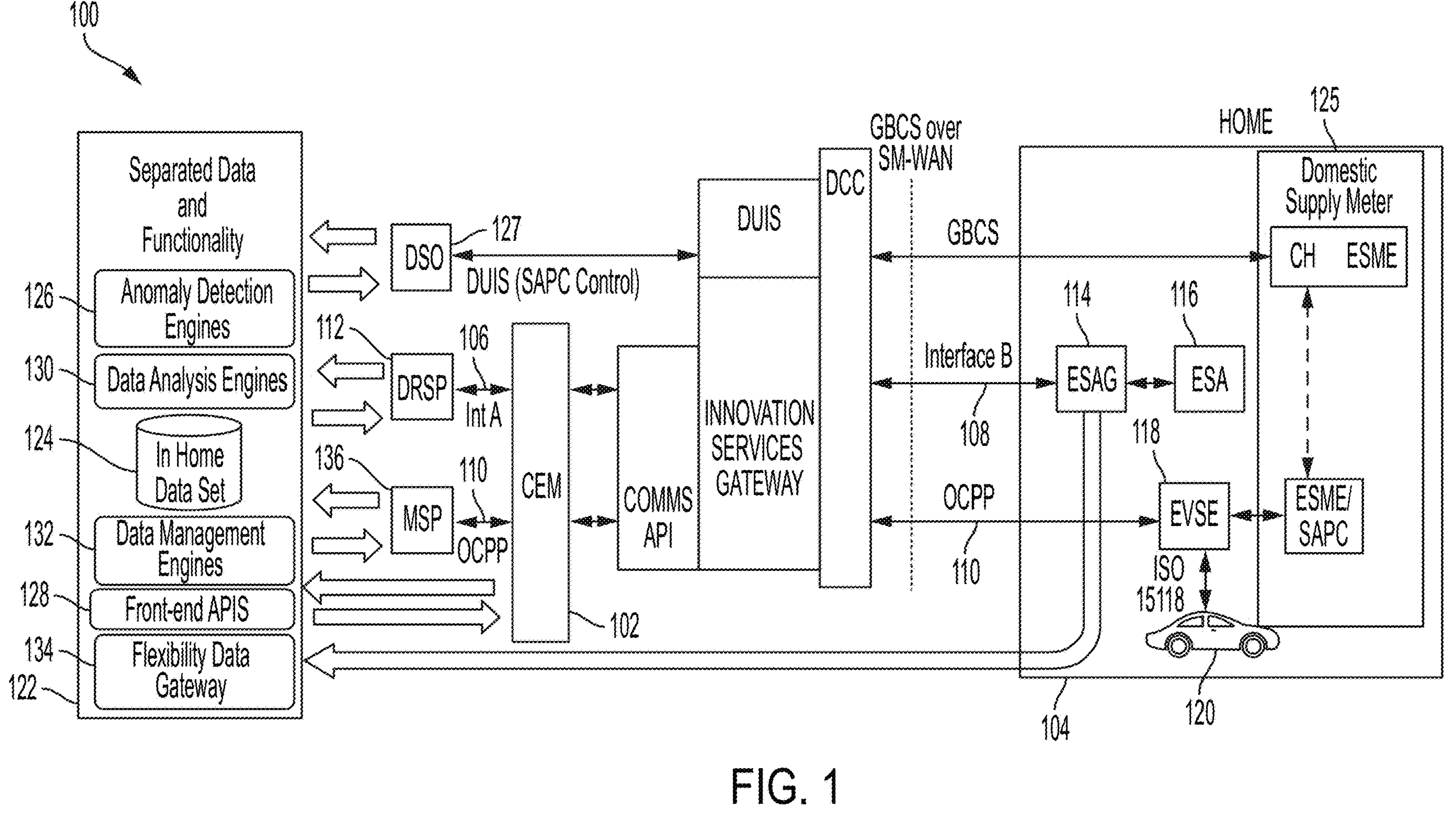
FIG. 1 is a diagram of an example distributed architecture for a secure control plane, according to some implementations described herein.

FIG. 1 is a diagram of an example distributed architecture 100 for a secure control plane, according to some implementations described herein. The distributed architecture 100 includes a customer energy manager (CEM) 102 that collects and compiles data relating to an energy consuming and monitoring devices in a home 104. While FIG. 1 is described with respect to the home 104, any other energy consuming premises may also be associated with a CEM that collects data relating to the energy consumption at the premises. In an example, the CEM 102 collects the data relating to energy consumption of the home 104 and provides a control infrastructure for components within the home 104 based on the collected data.

The distributed architecture also includes an interface A 106 and an interface B 108 that communicate with the CEM 102 to provide demand side response to a demand side response service provider (DSRSP) 112 and an energy smart appliance gateway (ESAG) 114. The DSRSP 112 and the ESAG 114 may provide communication gateways for the CEM 102 to obtain data from energy consuming devices within the home 104 and to control operation of the energy consuming devices within the home 104. For example, the DSRSP 112, which may be an energy retailer, may provide data to the CEM 102 regarding energy provided from the DSRSP 112 to the home 104, and the ESAG 114 may provide more granular data to the CEM 102 relating to energy consumption of energy smart appliances 116, which communicate with the ESAG 114 within the home 104. As used herein, the term energy retailer may refer to an entity that provides an energy user with an option for purchasing energy wholesale. In some examples, the energy retailer may be part of a utility company, while in additional examples, the energy retailer may not be affiliated with the utility company.

Additionally, the CEM 102 may include a tunneled Open Charge Point Protocol (OCPP) 110 that communicates across a wide area network (WAN) to support electric vehicle charging. For example, the tunneled OCPP 110 provides communication between the CEM 102 and electric vehicle supply equipment (EVSE) 118 and a mobility service provider (MSP) 136. In an example, the MSP 136 may be a provide mobility products and services to an EV operator, and the MSP 136 can provide control signals to the EVSE 118 through the CEM 102. The control signals provided by the MSP 136 to the EVSE 118 may include an unlock signal that enables the EVSE 118 to begin charging an electric vehicle 120. Upon receiving the unlock signal, the EVSE 118 may provide power to charge an electric vehicle 120 at the home 104.

The distributed architecture 100 also includes a data plane 122 that stores and analyzes data generated at and received from energy consumption data sources the home 104. In some examples, the data plane 122 may be a server that is located remotely from the CEM 102 and the home 104. The data plane 122 includes a home data set 124 that may include a copy of the data from each home on an electrical system. The data plane 122 also includes anomaly detection engines 126, frontend APIs 128, data analysis engines 130, data management engines 132, and a flexibility data gateway 134 to support flexible data storage at the data plane 122.

The inclusion of the CEM 102 may preserve trustless end-to-end encryption of data using a smart metering system with the DSRSP 112. Further, a whole-home-focused concept of anomaly detection and mitigation can be implemented. For example, the home data set 124 associated with the home 104 and received at the CEM 102 may result in the CEM 102 detecting and mitigating anomalies occurring on an electrical system of the home 104 to avoid events that may result in load shifting that could destabilize the grid. In some examples, anomaly detection may refer to detection of consumption events or patterns that may relate to the load shifting. In additional examples, the anomaly detection may refer to detecting components, such as the CEM 102 that are not operating properly.

In an example, the data plane 122 wraps consumer personal data generated by premises data sources at the home 104 in a security and privacy management service, where the consumers assert ownership of the consumer data and license the consumer data to approved DSR market participants (e.g., an entity that is able to perform a demand side response operation on devices within the home 104) and for analytic functionality for value adding services. The consumer personal data may include any data associated with a billpayer that is received from devices within the home 104 and relevant to energy consumption within the home 104. In some examples, the consumer personal data may also include data generated by a metering device 125 such as through a distribution system operator (DSO) 127, which is responsible for distributing and managing energy from a generation source to a final consumer (e.g., the billpayer associated with the home 104). Maintaining the home data set 124, which the DSR market participants may update to and access, establishes a problem of managing complex permissions. Developments in the field of cryptography, blockchains, smart contracts, and non-fungible tokens (NFTs) may simplify the problem of managing complex permissions.

For example, the data plane 122 may rely on an Ethereum blockchain to manage the permissions. Ethereum is a highly distributed, shared virtual machine which runs secure scripts and decentralized applications called smart contracts. Ethereum also includes a third-party decentralized filesystem. Similar to other implementations of blockchains, transaction entries in the Ethereum ledger are decentralized, immutable, and secure. For example, each node in the Ethereum network has a copy of the distributed ledger. There is no single point of failure or central authority to compromise. Additionally, once a transaction is entered in the ledger, each node in the network checks the validity of the transaction to arrive at a consensus regarding the transaction validity. If the entry is deemed valid, then the transaction is added to the ledger. There are a number of mechanisms for achieving consensus, such as a "Proof of Authority" mechanism, which enables a very rapid consensus to be achieved. Moreover, entries on a ledger are made up of cryptographic hashes that can be written with a public key. Accordingly, entries on the ledger are secure and not visible if a node is compromised.

The Ethereum Virtual Machine (EVM) is a sandboxed virtual machine that runs in each Ethereum node. Code written to compile to EVM bytecode is referred to as a smart contract and is most commonly written in a "Contract Oriented" programming language like Solidity and compiled to EVM bytecode for execution. In this manner, executed code is completely isolated from the network, filesystem, or any processes of the host computer. Every node in the Ethereum network runs an EVM instance and this enables the nodes to arrive at a consensus for executing the same instructions. This arrangement may enable secure code to be run in a trustless manner that is an enhanced form of trustlessness to the trustlessness existing in the control plane 122. For example, the trustlessness of the control plane 122 involves two participants. In contrast, the EVM trustlessness can involve all participants on the Ethereum network. For the sake of efficiency and minimizing electricity consumption, a chain configuration using Proof of Authority may rely on only a few participants of the Ethereum network to achieve consensus. In this manner, the EVM effectively exists at the Ethereum Network Level as a highly distributed single computer.

The smart contracts used on the Ethereum network are "object like" code that runs on the EVM. The smart contracts are tamper proof in that the code cannot be changed. Further, the smart contracts are immutable in that the records cannot be changed. The smart contracts are composable in that one smart contract is able to interact with other smart contracts. Further, the smart contracts are auditable both in the code sense and the transaction sense, and the smart contracts are cryptographically sound.

In an example, a non-fungible token (NFT) may be a cryptographically sound and unique representation of digital assets. The NFT may include an entry in a distributed ledger and a unique token that is cryptographically linked to that entry. Fungibility refers to the uniqueness of the asset. The NFTs may be used to create a digital concept of ownership. In implementation with the Ethereum network, the rules that constrain what can be done with an asset may be mediated by smart contracts. Thus, different NFTs can be mediated by their own system of interacting smart contracts, and more than one NFT may be assigned to an asset. Possession of an NFT can be made to determine what can be done with that asset, and an NFT can represent the permissions an NFT owner has with that asset.

The combination of smart contracts and NFTs may enable an approach to permissioning data and functionality for the home data sets 124. Ethereum's combination of an immutable ledger and EVM with trustless execution may enable assignment and management of permissions dynamically. The native functionality of smart contracts within Ethereum may also enable complex certificate hierarchies that can be dynamically created and managed. A hardware security model (HSM) of the ESAG 114 may operate as a certifying authority with a root certificate. The HSM may validate and add key sets representing individual billpayers, and the individual billpayers in turn can sign certificates in the data plane 122 that can be used to encrypt data generated at the home 104 at rest and in flight. Further, a billpayer's identity certificate can be used to sign the certificates used on the Ethereum blockchain for hashing operations. This security approach enables a billpayer to take on the role of data controller.

In recognizing ownership rights of household members other than the billpayer, the ESAG 114 can relate each identity of the household members to the billpayer, and NFTs can be used to manage collective data rights of the household with the billpayer serving in a nominated decision maker role. Additionally, a concept of a data trust, that is a data set associated with a home, may be sold as part of a home purchase such that a new owner can take advantage of the historical data set that already allows the CEM 102 to optimize for that home 104 or other premises.

Implementation of the permissions management provided by the Ethereum network may enable implementation of a form of billpayer controlled licensing. The DSRSPs 112, charge point operators (CPOs), and CEMs 102 can define access requirements and time periods for the billpayer's data and request a license from the billpayer to use the data. Such requests can be provided to the billpayer on an in-home user interface. The permissions management system may also allow for licensing of functionality. Using modern cloud capabilities in serverless functions, flexibility service providers may write their own functions and deploy them directly into the data plane 122, as permissioned by the billpayer, to analyze the billpayer's own home data set 124.

Further, with so much billpayer control over the use of data, a basic level of permissions may be implemented for the data plane 122 to function. The basic level of permission may be implemented as a basic license pack the covers a minimum set of permissions a billpayer needs to grant to use the data plane 122. The basic level of permission may include a basic functionality in the data plane 122 required to change energy suppliers at the home 104. Additionally, the basic level of permission may also include granting a form of court ordered access to data sets or procedures for handling events like the death of a billpayer. In an example, implementing the licenses as smart contracts may help promote public trust in the system.

Figure 2:
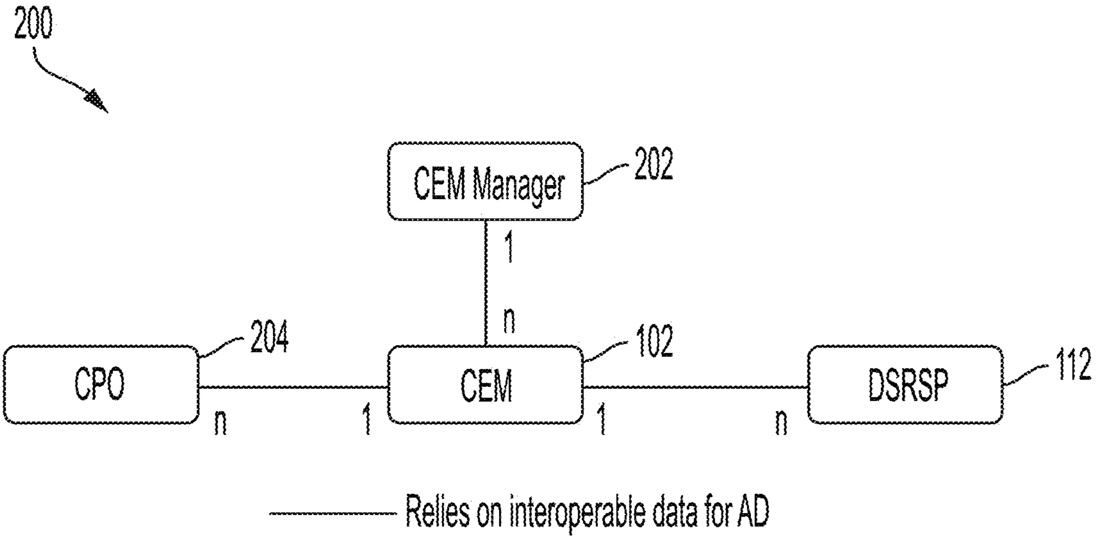
FIG. 2 is a diagram of an example energy management control system, according to some implementations described herein.

FIG. 2 is a diagram of an example energy management control system 200, according to some implementations described herein. The energy management control system 200 includes a CEM manager 202 (i.e., an energy management system) that enables trustless messaging for the CEM 102 and that also manages higher order security concerns for the whole electrical system associated with the data plane 122 of FIG. 1. As illustrated, the CEM manager 202 can include a one-to-many relationship with the CEM 102. That is, an individual CEM manager 202 may be associated with several CEMs 102 that are each associated with individual premises. In an example, the CEM manager 202 monitors and manages commands that are received at the CEM manager 202 to ensure that, in the event of the CEM 102 being compromised, the energy management control system 200 will not allow a mass load shifting event to destabilize the grid. Because the CEM manager 202 has a view across many CEMs 102, anomaly detection (AD) employed in both the CEM 102 (e.g., of an individual premises) and the CEM manager 202 (e.g., of several premises) can provide a more robust anomaly detection and mitigation than anomaly detection based on data received from a single premises. The anomaly detection may refer to anomalies associated with both messaging of the CEM 102 or the CEM manager 202 and with operating parameters of the grid system. For example, anomaly detection may involve detecting conflicting control signals to energy consumption devices within the home 104 (e.g., running the heater and the air conditioner at the same time). Further, the anomaly detection may involve detecting grid abnormalities or situations that my result in grid abnormalities. For example, the anomaly detection may involve detecting too many EVs being charged at a particular time, or an continually increasing number of EVs beginning a charge cycle over a period of time. Other anomaly situations may also be detected by analyzing data of energy consumption devices at a premises.

The CEM 102 may be associated with an individual premises. In other words, the consumer has a single portal through the CEM 102 to control and communicate with smart grid devices at the premises. The platform nature of the data plane 122 can enable a 'plug-in' capability for manufacturers of energy smart appliances (ESAs) or demand side response service providers (DSRSPs) 112 and charge point operators (CPOs) 204 to create enhanced, value-added services that may not be possible without visibility of the whole home data set of the premises 104. In an example, the communication between the CPO 204, the CEM 102, the CEM manager 202, and the DSRSP 112 may all rely on interoperable data of the whole home data set of the premises 104 for enhanced anomaly detection.

Figure 3:
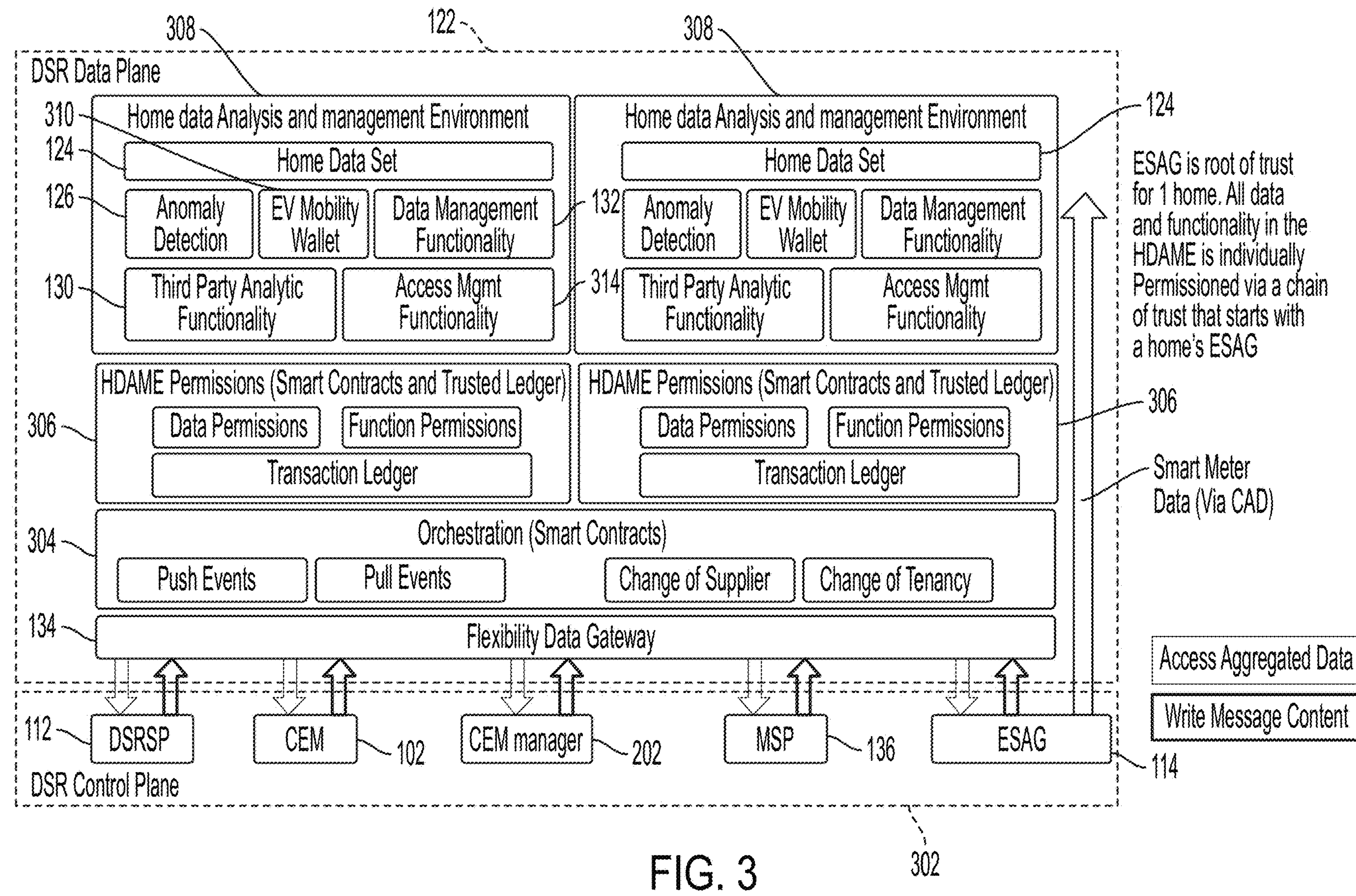
FIG. 3 is a diagram of an example demand side response control plane and demand side response data plane, according to some implementations described herein.

FIG. 3 is a diagram of an example demand side response control plane 302 and the demand side response data plane 122, according to some implementations described herein. As discussed above with respect to FIG. 1, the data plane 122 includes the flexibility data gateway 134, which provides an access point for the data received from the control plane 302. An orchestration layer 304 of the data plane 122 may be a distributed layer that is capable of coordinating a change of supplier to a billpayer and a change of tenancy event of a billpayer. The orchestration layer 304 may also provide support for push and pull messaging events.

In an example, home data analysis and management environment (HDAME) permissions 306 provide a mechanism for configuring and storing data and functions permissions. The HDAME permissions 306 may include smart contracts, NFT functionality, and a distributed ledger that records the smart contracts. In some examples, the smart contracts and NFT functionality may establish permissions for various entities to receive and use data relating to energy consumption of a billpayer. The data relating to the energy consumption may be associated with a premises of the billpayer or with a remote premises visited by the billpayer, such as through an electric vehicle (EV) mobility wallet 310 that enables roaming use of residential EV chargers. Additionally, the smart contract and NFT functionality of the HDAME permissions 306 may provide function permissions that enable a sophisticated dynamic approach to managing permissions and user licensing of regulated (e.g., with the energy retailers and entities providing DSR control) and third-party functionality (e.g., with third-parties providing data analysis, academic research, or other services). The transaction ledgers of the HDAME permissions 306 include a master record of every transaction that occurs on an HDAME 308 as well as every NFT. The transaction ledger may maintain as a transaction record a pointer to a distributed object store where the home data set 124 is held.

Further, the data plane 122 includes one or more HDAMEs 308. The HDAMEs 308 may include the home data set 124 (or premises data set). The HDAMEs 308 may also be a permissioned area, as established by the HDAME permissions 306, where custom analytic functionality can be provided to deliver services that are directly licensed by the consumer (e.g., a billpayer). In an example, the HDAMEs 308 may include the anomaly detection engines 126, an EV mobility wallet 310, data management engines 132, data analysis engines 130, and access management functionality 314.

The HDAMEs 308 may be deployed as serverless functions that are cryptographically tied to smart contracts in the EVM via NFTs. Each function may be provisioned with appropriate NFTs and interfaces that are secured and tightly permissioned using the PEPKI. Other approaches may also be used, but serverless functions represent a highly efficient approach to delivering functionality at a minimal cost. In an example, an HDAME 308 can be deployed in a single subnet of a larger network.

The home data set 124 may be a data set that includes a time series of data (e.g., time-stamped data) from premises data sources such as the ESAs 116 and the EVSEs 118. Additionally, the home data set 124 may be enriched with smart meter data which may be ingested from the ESAG 114 via a consumer access device of the smart meter. In an example, the home data set 124 includes a register of which energy suppliers are associated with each device, and the register may be considered a master record for the supplier information. The energy suppliers of a device may change over time, and the register may be updated as the energy suppliers change. To enable additional functionality in either the anomaly detection engine 126, the data management engine 132, or the data analysis engine 130, the data set may be enriched with information about the weather and local conditions.

The anomaly detection engine 126 may be used for analysis of the home data set 124 in response to a query from the CEM 102 as a part of the trustless message flow of the control plane 302. Access to the home data set 124 may enable the anomaly detection engine 126 to detect if a message undergoing verification will interact in an unsafe way (e.g., as a detected anomaly) with the current state of a device that is outside of a system actor's (e.g., the DSRSP 112, the CEM 102, the CEM manager 202, the MSP 136, the ESAG 114, etc.) range of visibility into the home. The anomaly detection engine 126 can also be established with an agreed set of rules to apply to messages to decide whether a message should be verified through a secure communication mechanism. The anomaly detection engine 126 may be maintained by a regulated and audited process to ensure reliability.

The EV mobility wallet 310 may track an expenditure of a billpayer while using third party EVSEs 118. Updates between wallets can be made using the orchestration layer 304.

The data management engine 132 may include the basic regulated functionality of the HDAME 308 including basic data management aggregation and regulated anonymization processes. Regulated functionality may refer to the regulation of data in a manner that respects privacy of a data owner. The regulated anonymization processes may use support in the orchestration layer 304 to aggregate and move anonymized data securely into other analytic environments while respecting the privacy of the data owner (e.g., the billpayer). The anonymization processes may be useful for academic access or specific analytic needs of the transmission systems operators and distribution systems operators and even relevant government entities. The data management engine 132 may be maintained by a regulated and audited process.

The data analysis engine 130 may be the platform functionality of the data plane 122. The data analysis engine 130 can be considered an accompaniment to the concept of the CEM 102. The data plane approach to permissions management and secure storage means DSRSPs 112, MSPs 136, CEMs 102, and CEM managers 202 may each deploy sets of analytic functionality into the HDAME 308 after requesting a license from the data owner.

The access management functionality 314 includes a regulated functionality that enables data to be securely accessed and stored. The access management functionality 314 may be maintained by a regulated and audited process.

For data security, a data plane key infrastructure (DaPKI) may be used to secure access to the data plane 122 for industry participants, such as the target actors (e.g., controllers of a control plane 302 such as the DSRSP 112, the CEM 102, the CEM manager 202, the MSP 136, the ESAG 114, etc.). In an example, a personal energy public key infrastructure (PEPKI), which creates a public key infrastructure (PKI) for every home and individual security digital certificates for each billpayer, may enable the billpayer to control licensing of access to billpayer data through the smart contracts of the HDAME permissions 306. This security infrastructure may ensure that the billpayer remains the data owner with control over a boundary of privacy for the home data set 124.

The data plane 122 may interact with the control plane 302 through the flexibility data gateway 134. For example, the DSRSP 112, the CEM 102, the CEM manager 202, the MSP 136, the ESAG 114, or any other control components of the control plane 302 may all write message content to the data plane 122 through the flexibility data gateway 134. Further, the components of the control plane 302 may receive aggregated data from the data plane 122. In an example, the aggregated data may be acted upon by the components of the control plane 302 to control operation of energy consumption devices in a manner that avoids or mitigates anomalies or destabilizing load shifts on the grid.

The flexibility data gateway 134, in an example, provides a single access point from the control plane 302 to the data plane 122. Data paths to the data plane 122 may be encrypted in transport and users may be authenticated. The data that is requested from the data plane 122 can be encrypted to a target of a valid requester. To enable the encryption, the DaPKI may be established that is separate from the ESAG-based home API. Thus, even if the data plane 122 is implemented in a public cloud infrastructure, the flexibility data gateway 134 may still be located within a secure network that is separated from the Internet.

As discussed above with respect to FIG. 1, the Ethereum virtual machine (EVM) may exist in a distributed manner between deployed Ethereum nodes. The data plane orchestration layer 304 includes a system of smart contracts that manage updates to individual HDAME supplier registers as well as messaging support for push and pull events to and from the flexibility data gateway 134. Ethereum may also support a highly secure, distributed file system called interplanetary filesystem (IPFS), which can be used as secure transport for messaging between the HDAMEs 308. In an example, the orchestration layer 304, being a common distributed component, may make use of certificates provisioned from the DaPKI. Further, change of supplier and change of tenancy processes may include a coordinated series of updates to the HDAME supplier register and confirmations from the losing and gaining suppliers. Both the change of supplier and the change of tenancy processes may be used to manage the movement of permissions and potentially data between the HDAMEs 308.

With the data stored only on a meter device, the more parties that need to access data the less scalable a data processing architecture becomes when constrained by bandwidth. The data plane 122, which may be stored remote from the metering device, enables fragmentation and distribution of all consumer data into the home data sets 124, which may be convenient units of data portability. For example, the data plane 122 enables encryption of consumer data at rest (e.g., while the data is stored at a memory device of the data plane 122) and in flight (e.g., while the data is being transmitted from the data plane 122 to a target actor); secured, permissioned, licensed, and managed by the consumers' own PEPKI. Further, the data analysis engines 130 running in the HDAME 308 may be licensed and permissioned using the same PEPKI of the consumer. Within the perimeter of an individual HDAME 308, the PEPKI may be used for all cryptographic operations both within the Ethereum component perimeter and to secure data in flight and at rest.

Although a smart metering system at a premises generates much useful data, accessing the data may be difficult, expensive, and complex. By implementing the HDAME permissions 306 of the data plane 122, accessing data from the premises for innovation or research purposes becomes much more straightforward, and the consumer has full granular privacy control over what data specific parties are able to access from the home data set 124. For example, the PEPKI enables a complete home data set 124 (e.g., of a premises or associated with a billpayer) to be maintained securely in a manner that is able to be licensed and permissioned to specific parties by the billpayer. A billpayer may decide to grant licenses for some kinds of academic research, whereas other types of access for academia or other public benefit may be mandated through the concept of an agreed and regulated basic licensing package, which a billpayer would agree to as a basic condition of participation in the system.

Further, as energy consumption becomes more common in a roaming environment, such as with electric vehicles, portability of the system becomes much more desirable. The architecture of the data plane 122 may enable portability to roam to other domestic chargers outside of a consumer's premises, and a system of home charging for guests or a series of other possible innovative services may be generated. This may be enabled both by the permissioned functionality in the data plane 122 and the speed and ease of access of data afforded by the data plane 122.

The data plane 122 may also provide aggregation of home data sets 124 from different premises. In some examples, each of the home data sets 124 may be secured, and the billpayers associated with each of the home data sets 124 may provide permissions for target actors to access the home data sets 124. Aggregation may enable grid optimization by orchestrating activities of small distributed energy resources (e.g., solar power, EV charging, wind power, etc.) to allow the system to respond from both a supply side (e.g., power generation) and the demand side (e.g., through demand side response). In an example, accurate and timely telemetry from sensors across transmission lines, distribution lines, and in the home may enable a comprehensive view of activity on the electricity grid. Optimization activities enabled by the data plane 122 and the control plane 302 may include optimizing power flows within a distribution network, responding to voltage sags and swells within the distribution network (e.g., anomalies), and local grid load management, where the local network may need reinforcing. The local network may need reinforcing, for example, when a number of electric vehicles commence charging in a particular area.

Figure 4:
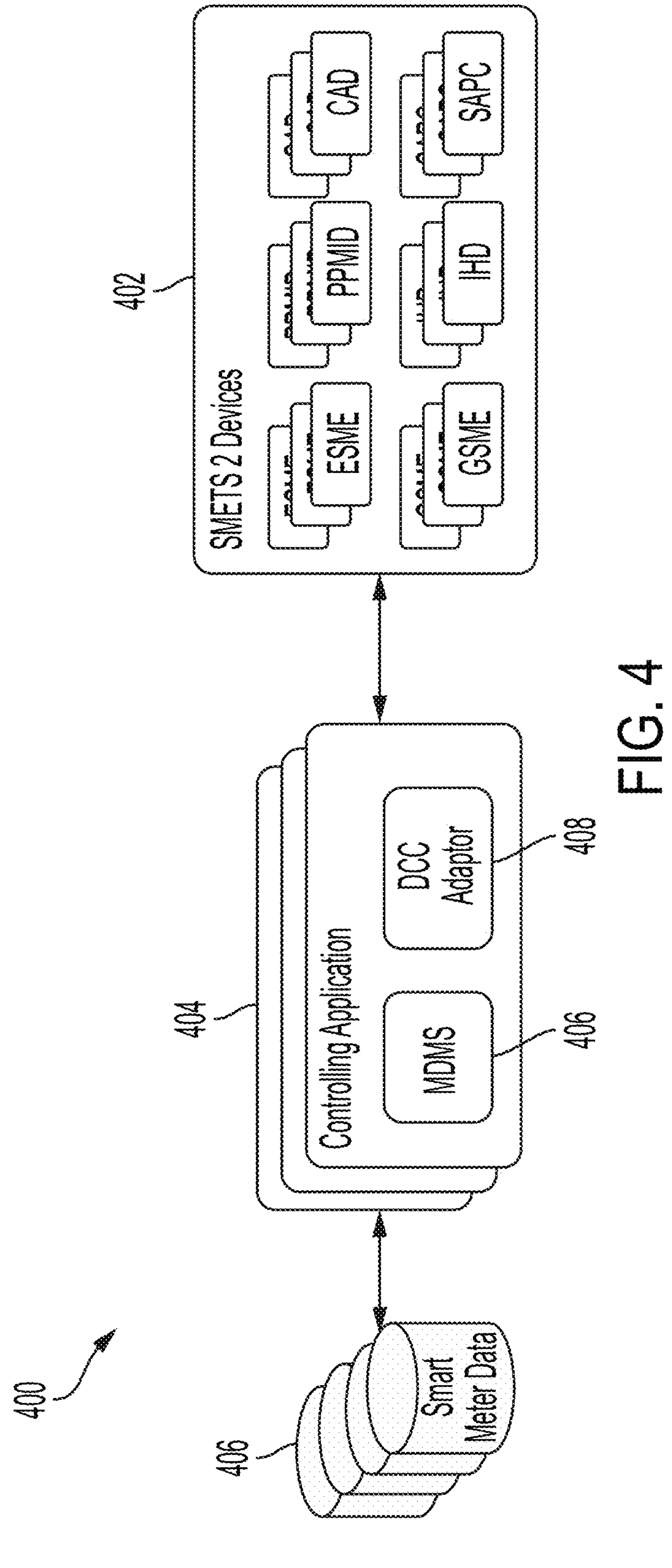
FIG. 4 is a diagram of a flow of data between devices generating the data at a premises and devices storing the data, according to some implementations described herein.

FIG. 4 is a diagram of a flow of data 400 between devices generating the data at a premises and devices storing the data, according to some implementations described herein. The smart meter devices 402 may include electricity smart meters (ESME), prepayment meter interface devices (PPMIDs), consumer access devices (CAD), gas smart meters (GSMEs), in-home displays (IHD) for smart meters, standalone auxiliary proportional controllers (SAPCs), or any other devices that operate to provide functionality to smart meters. Smart meter devices 402 may generate a wealth of useful sensor telemetry that tracks both consumption and a range of power quality indicators at premises associated with the smart metering devices 402. The smart metering devices 402 may also enable remote disconnection of a premises and remote control of compatible devices.

In some examples, smart metering devices 402 from a number of different manufacturers may all operate on the same home area network (HAN). Because the smart metering devices 402 originate from a number of manufacturers, interoperability between the smart metering devices 402 that are deployable in a number of combinations may be useful for implementation of the smart metering devices 402 with the data plane 122 and the control plane 302. As illustrated, any number of controlling applications 404 may be deployed to control the smart metering devices 402. For example, one or more meter data management systems (MDMSs) 406 or data and communications company (DCC) adaptors 408 may be implemented to receive data from the smart metering devices 402 and provide control functionality to the smart metering devices 402.

Role based access control (RBAC) may be established to provide authorization to access smart meter data 406 to a number of parties. In some examples, the RBAC may provide end-to-end encryption, trustless messaging, and user authentication. Due to the security model and the privacy model, the DCC adaptors 408 of the controlling applications 404 may operate as a data processor. For example, the interaction of the interoperability of the smart metering devices 402 combined with the security model and the privacy model ensures that customer data that rests with an energy retailer is only the data that a DCC user role authorizes the retailer to have access to and only for so long as that user is a customer of the retailer. This ensures that the smart meter data sets 406 are fragmented, siloed, and protected by design and that the use of the smart meter data sets 406 is regulated in accordance with permissions provided by the customer (e.g., the owner of the smart meter data sets 406).

Figure 5:
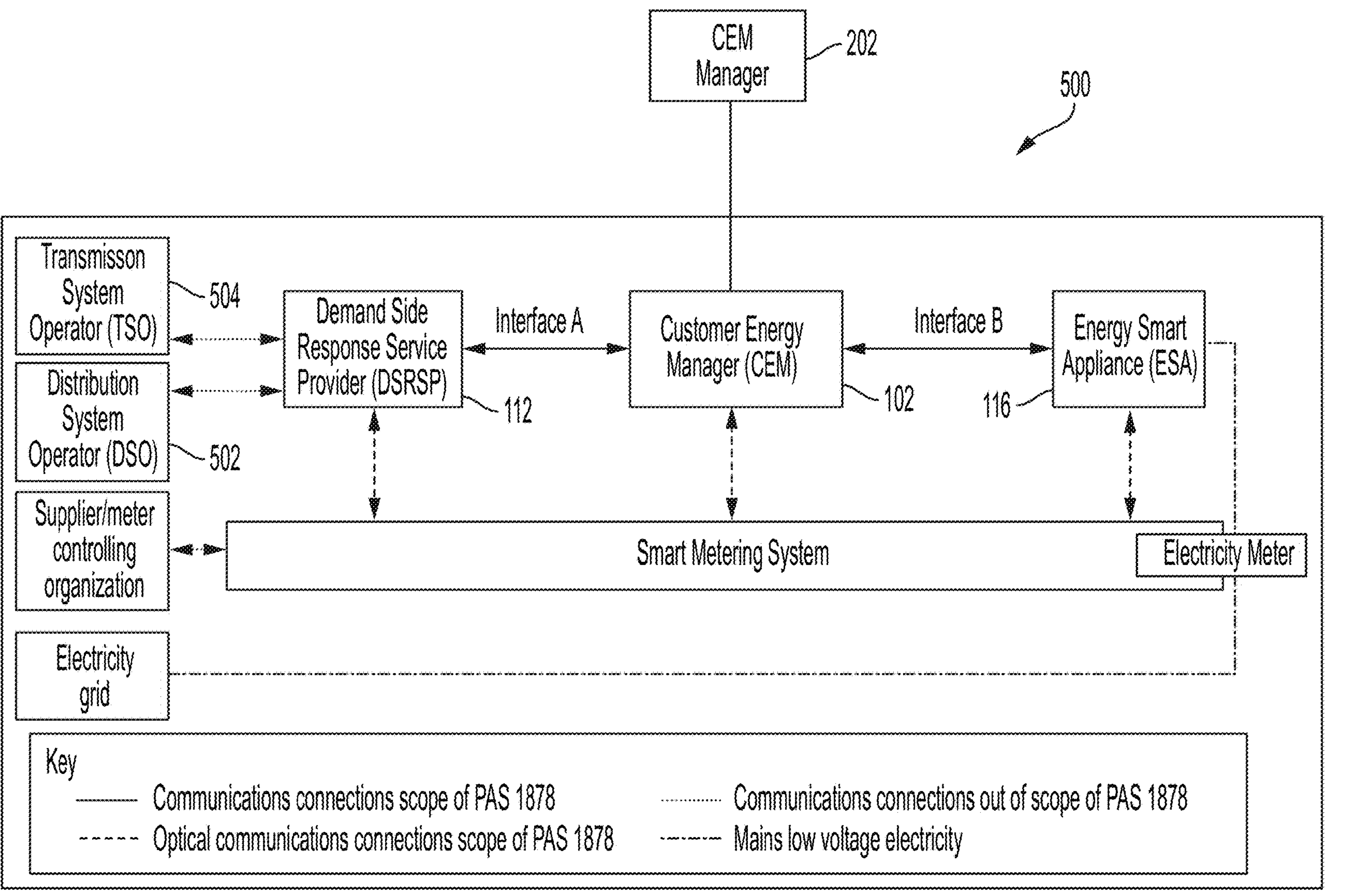
FIG. 5 is a diagram of an example of a logical architecture for demand side response, according to some implementations described herein.

FIG. 5 is a diagram of an example of a logical architecture 500 for demand side response, according to some implementations described herein. The logical architecture 500 includes three logical components: (1) the demand side response service provider (DSRSP) 112; (2) the customer energy manager (CEM) 102; and (3) the energy smart appliance (ESA) 116. The role of the DSRSP 112 may be to aggregate ESAs 116 in dispatchable units (e.g., energy consumed by the ESAs 116 for a given amount of time) for sale to distribution system operators (DSOs) 502 (e.g., the DSO 127 of FIG. 1) and transmission system operators (TSOs) 504 (e.g., entities entrusted with transporting energy on a national or regional level using an energy transmission system infrastructure). The DSRSP 112 may also operate to 'optimize on behalf of' distribution and transmission networks. A single home 104 or premises may have a number of different DSRSPs 112 providing flexibility services to the home 104 or premises. This may raise the possibility of contradictory control signals being sent to ESAs 116. For example, one DSRSP 112 may provide an erroneous instruction to engage a heater in the home 104 and another DSRSP 112 may provide an instruction to engage the air conditioner in the home 104 at the same time. This type of collision may be mitigated with the anomaly detection engines 126 of the data plane 122 with a view of the whole home data set 124, as described above with respect to FIG. 1.

Additionally, the CEM 102 may also provide optimizing functionality. Given the role of the DSRSP 112 that optimizes on behalf of the distribution and transmission networks, the CEM 102 may operate to optimize on behalf of the individual home 104 or premises. Accordingly, consumer focused role of the CEM 102 may suggest a supervisory role for the CEM 102 in relation to the DSRSP 112 or a charge point operator (CPO). Providing anomaly detection and message verification at the CEM 102 would enable the DSRSP 112 or CPO to implement an end-to-end trustless messaging system. To fulfil the role of optimizing on behalf of one home or premises, the CEM 102 may have an overall view of telemetry from devices in the individual home or premises that are generating data relating to energy consumption.

Further, the ESAs 116 can be intelligent major appliances, HVACs, inverters connected to batteries, solar cells, or other intelligent appliances within a home or premises. In other words, the ESAs may be distributed energy resources that DSRSPs 112 aggregate on behalf of the DSOs 502 and the TSOs 504. The ESAs 116 may be capable of being contacted by the CEM 102 or the DSRSP 112 while making no protocol level distinction between which messages can be processed by each. Additionally, the ESAs 116 may authenticate and encrypt/decrypt messages from CEM 102, DSRSPs 112, and the CPOs.

In some examples, the CPOs, such as the CPO 204 of FIG. 2, may be included in addition to the DSRSPs 112, the CEM 102, and the ESAs 116. The CPOs may be an open charge point protocol (OCPP) compliant, electric vehicle supply equipment (EVSE) controlling application. In an example, the CPOs may be adapted to support end-to-end trustless messaging by creating a similar relationship with the CEM 102 as the DSRSPs 112 to enable the benefits of anomaly detection by the CEM 102 with a view of the whole home data set.

In an example, the EVSE, such as the EVSE 118 of FIG. 1, is OCPP compliant with an integrated standalone auxiliary proportional controller (SAPC) for distribution network operator (DNO) load control override. The EVSE may also implement end-to-end security with the CPO. In an example, the EVSEs are capable of being contacted by the CEM 102 or the CPO while making no protocol level distinction between which messages can be processed by each. Additionally, the EVSEs may authenticate and encrypt/decrypt messages from CEM 102, the DSRSPs 112, and the CPOs.

The CEM manager 202 (e.g., an energy management system) may provide a second anomaly detection capability that manages the activity of several of the CEMs 102. For example, a CEM 102 that appears to be malfunctioning or poorly functioning can have its ability to send and verify messages throttled by the CEM manager 202. Additionally, the 1 to many relationships between the CEM manager 202 and the CEMs 102 may enable management and supervision of the CEMs 102. For example, the CEMs 102 can be grouped by manufacturer and/or geographic location or any other number of logical groupings that enable security and safety oversight. The implementation of the CEM managers 202 may provide the ability to aggregate data to anticipate risks to homes and premises and to bolster grid stability. For example, the CEM managers 202 can detect and mitigate anomalies resulting from rapid cycling of high current appliances or new sources of harmonic distortion, such as heat pumps, across a plurality of homes and other premises.

Figure 6:
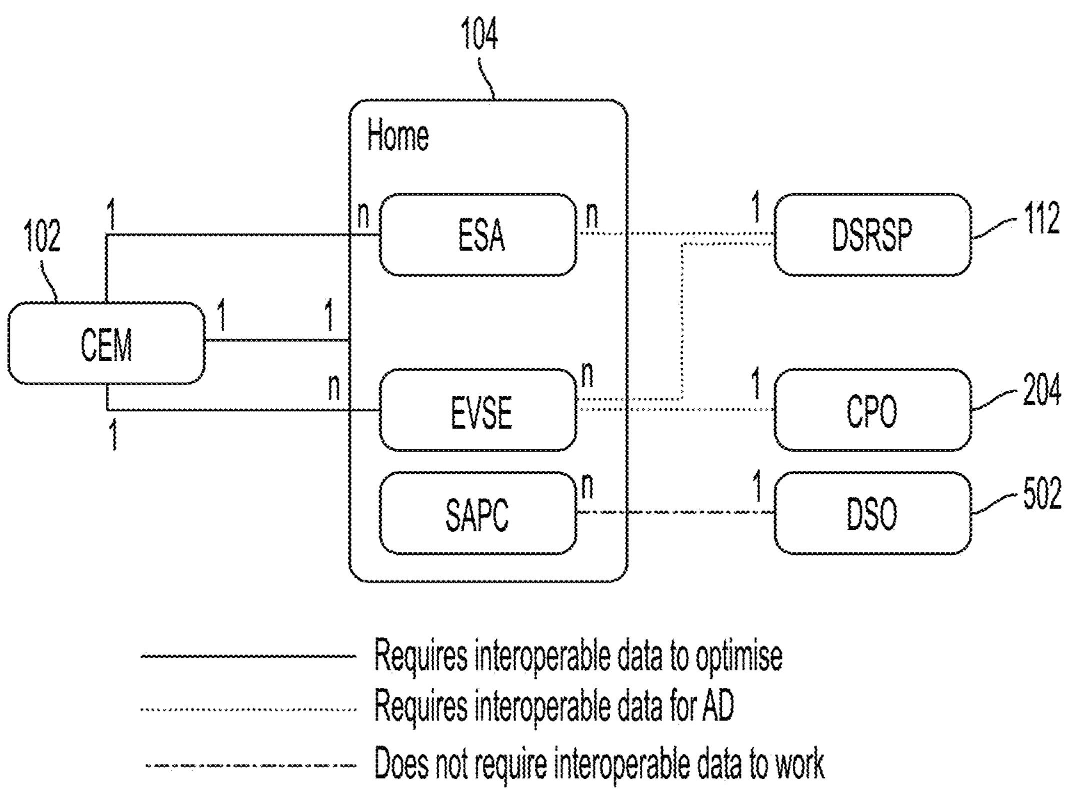
FIG. 6 is a diagram of an example of data cardinality of an energy management device associated with a premises, according to some implementations described herein.

FIG. 6 is a diagram of an example of data cardinality of an energy management device associated with a premises, according to some implementations described herein. As shown, the premises may include the home 104, but other premises may include similar data cardinalities. The data cardinality, which illustrates a number of devices with which each device is able to communicate, depicts challenges for anomaly detection and optimizing functions when consumer data is moved around controlling applications while preserving the high level of security and privacy established for the consumer data. For example, the CEM 102 may communicate with an individual home 104, but the individual home may include a large number of devices (e.g., EVSEs 118 and ESAs 116 such as heating, ventilation, and air conditioning (HVAC), cold and wet appliances, battery storage, etc.) that generate data accessible by the CEM 102. Further, DSRSPs 112, CPOs 204, and DSOs 502 may also all communicate with a number of devices that generate data. This fragmentation may make anomaly detection making use of this information difficult, and the whole home data set concept may enable data portability to simplify data access while meeting security and privacy concerns associated with the system.

In some examples, the CEM 102 may optimize the devices within the home 104 using interoperable data from the devices within the home 104. Additionally, the DSRSP 112 and the CPO 204 may rely on interoperable data from the devices within the home 104 to provide anomaly detection. The DSO 502 may not rely on interoperability from the standalone auxiliary proportional controller (SAPC) to operate.

Figure 7:
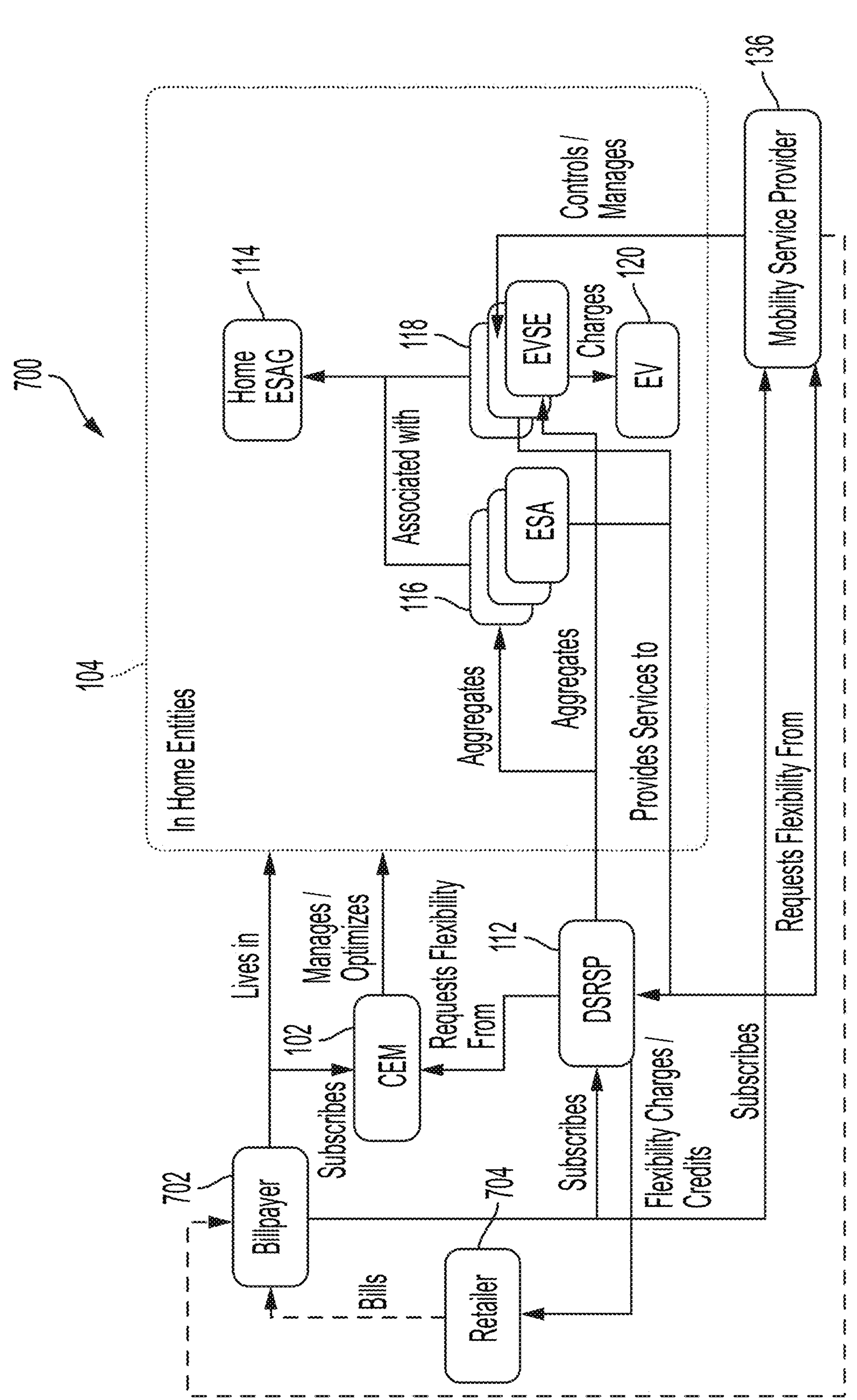
FIG. 7 is a diagram of an example of component organizational relationships of an energy management control system, according to some implementations described herein.

FIG. 7 is a diagram of an example of component organizational relationships of an energy management control system 700, according to some implementations described herein. In an example, a billpayer 702 that lives in the home 104 may subscribe to the CEM 102. As discussed above, the CEM 102 is implemented as a software component that manages and optimizes operations of energy consumption within the home 104. The billpayer 702 may also subscribe to the DSRSP 112 and the mobility service provider 136.

The DSRSP 112 may function to optimize components of the home 104 on behalf of distribution and transmission networks. Accordingly, the DSRSP 112 may request flexibility from the CEM 102 to aggregate the ESAs 116 and the EVSEs 118 associated with the home ESAG 114 for sale to distribution system operators and transmission system operators. In some examples, the DSRSP 112 may use the data obtained from aggregating the ESAs 116 and the EVSEs 118 to provide flexibility charges and credits to a retailer 704. The retailer may use the flexibility charges and credits in addition to meter readings to generate a bill provided to the billpayer 702. In some examples, a credit may include an indication that power consumed by the EVSE 118 at the home 104 was used to charge the electric vehicle 120 owned by a separate billpayer. In the example, the separate billpayer may be billed for the that charging operation, and the billpayer 702 living in the home 104 will not also be billed. Other credits and charges may also be provided to the retailer 704 in a similar manner.

Additionally, the mobility service provider 136 controls or manages the EVSEs 118 for charging the electric vehicle 120. The mobility service provider 136 may request flexibility from the DSRSP 112 to control or otherwise manage the EVSEs 118. Further, the mobility service provider 136 may provide a bill to the billpayer 702 based on the charging operations performed by the EVSEs 118.

Because of the complex interactions between controller components (e.g., the CEM 102, the mobility service provider 136, and the DSRSP 112), which would also lead to complex interactions between privacy and security models, a whole home data set, such as the data set 124 of FIG. 1, may be generated to simplify these interactions between the controller components. The whole home data set may include all telemetry data generated within the home 104 and a register of suppliers that are associated with each of the devices generating the telemetry data. In this example, data flows once from a device to a controller before being uploaded into the whole home data set. Interoperability of the devices within the home 104 can be achieved by managing which entities have permission to access the whole home data set.

Once the whole home data set is generated, the data set associated with one home becomes a unit of storage, management, and reporting. The home data set should be the minimum unit of storage distribution. The data, stored for example in the cloud, can be distributed as widely as enabled by performance requirements. In an example, the home data sets are stored both logically and physically separate from each other to enhance security and, if required, fragmented further while preserving data structure. Additionally, data items included in a home data set may be encrypted at rest and access to the home data set may be permissioned. Further, any reports or analyses of the home data set may be dynamically produced and encrypted to a target of a valid requestor. In using these security and permissions schemes, the billpayer and the devices in the home 104 are the boundary of privacy and not the home 104 itself.

In an example, the home data set and its contents are tagged with relevant industry identifiers such as meter point administration numbers (MPANs) and other submeter identifiers. Further, the home data set may also include a register of which energy suppliers are associated with each ESA and EVSE, and the register may provide a system of record for the home data set.

Figure 8:
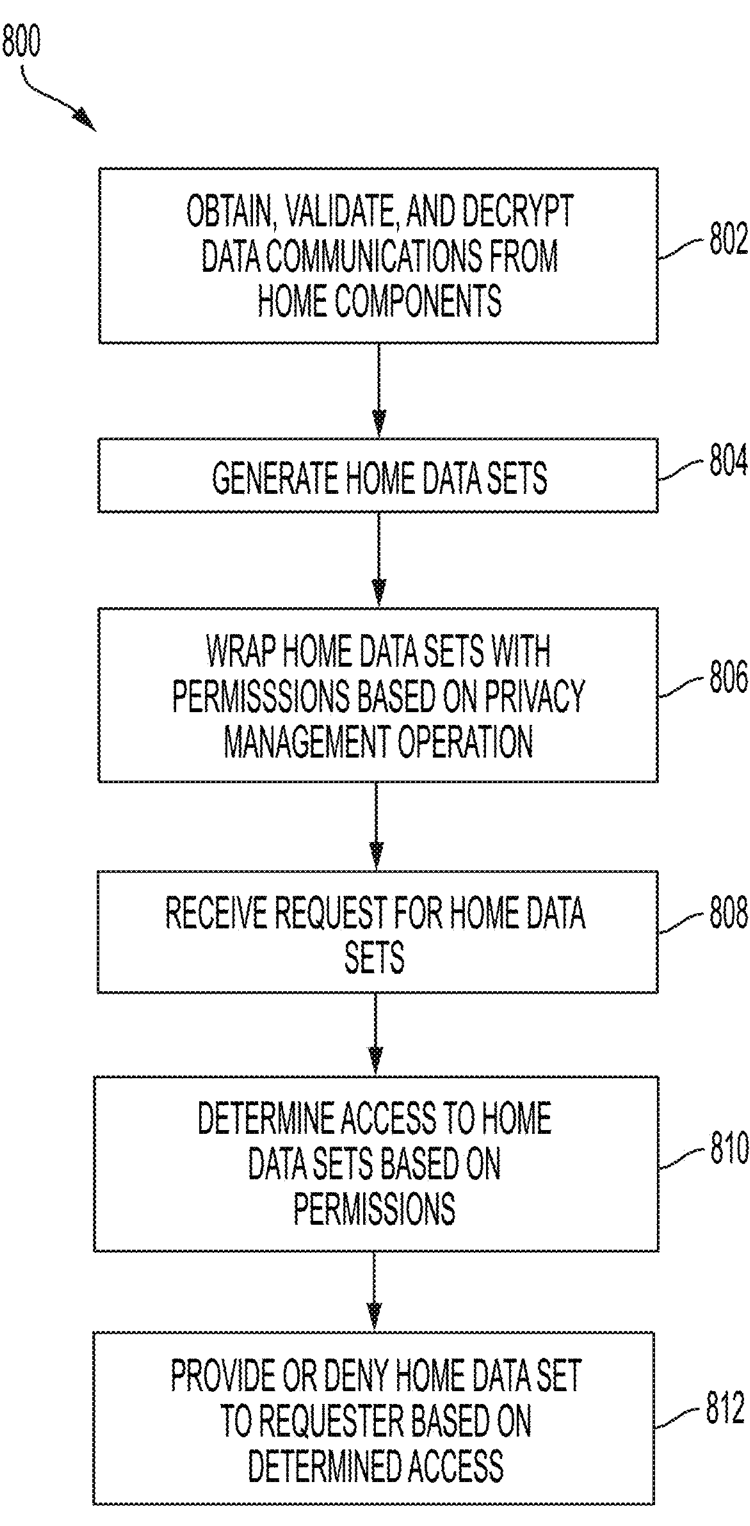
FIG. 8 is a flowchart of a process for performing demand side response with an energy management control system, according to some implementations described herein.

FIG. 8 is a flowchart of a process 800 for performing demand side response with an energy management control system, according to some implementations described herein. At block 802, the process 800 involves obtaining or accessing, validating, and decrypting data communications from home components. In an example, the home components may be any telemetry enabled devices at a premises capable of transmitting data relating to energy consumption at the premises across a communications interface.

At block 804, the process 800 involves generating home data sets based on the data received from the home components. The home data set, which may be stored at the data plane 122, may provide a whole home view of the data consumption at the premises. The whole home view may be valuable for analysis and anomaly detection used in optimizing energy consumption in a demand side response system.

At block 806, the process 800 involves wrapping the home data sets with a permissions based on a privacy management operation. The permissions wrapping the home data sets may prevent entities or data targets that have not received the appropriate permissions from a billpayer from accessing the data. The billpayer may generate the permissions for the entities based on the specific entities or based on the functions provided by the entities.

At block 808, the process 800 involves receiving a request for home data sets from an entity, and, at block 810, the process 800 involves determining if the entity has access to the home data set based on the permissions provided by the billpayer. If the entity does have access based on the permissions, then, at block 812, the process 800 involves providing the home data set to the requesting entity. Otherwise, the process 800 involves denying the entity access to the home data set.

Figure 9:
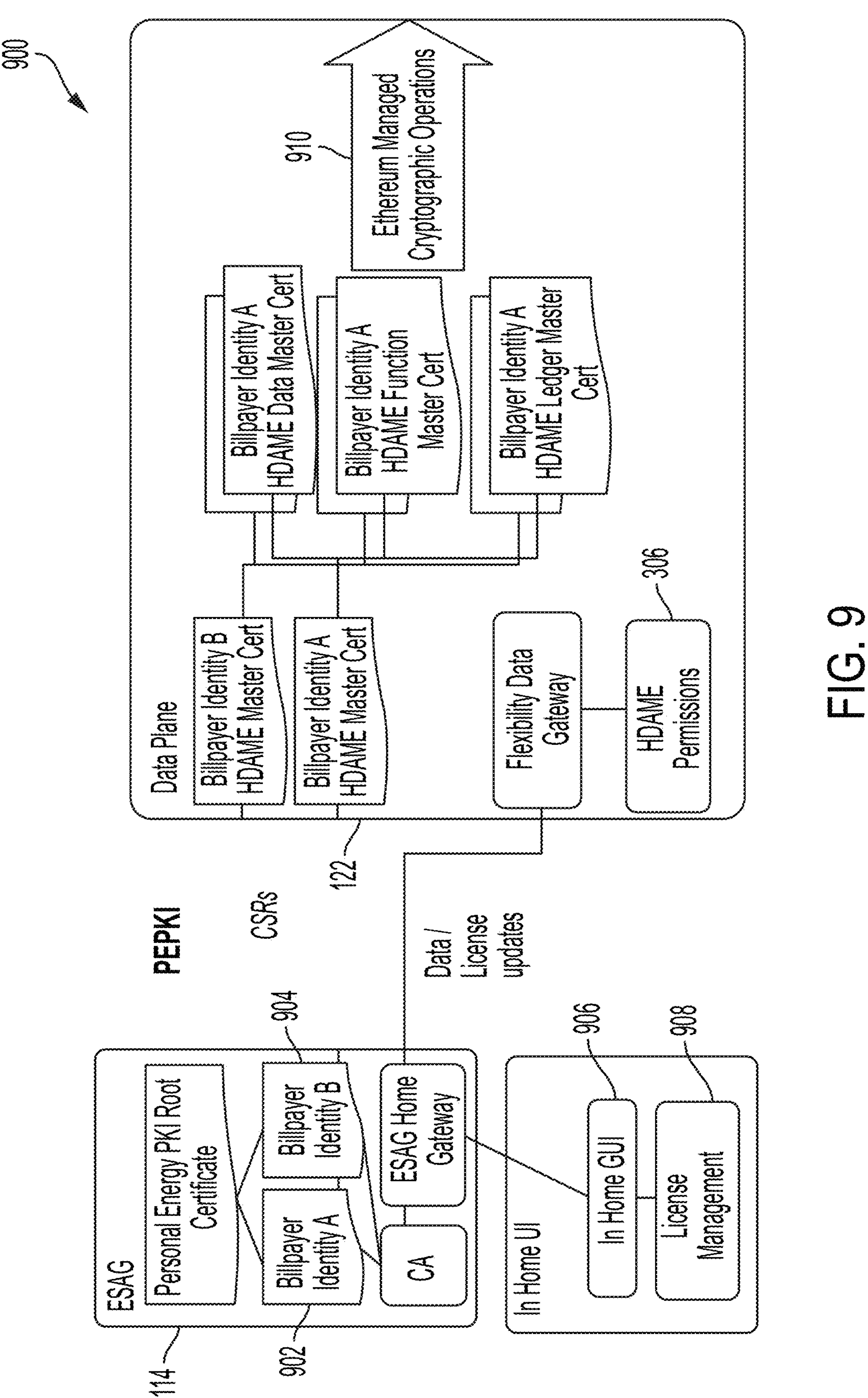
FIG. 9 is a diagram of an example Personal Energy Public Key Infrastructure (PEPKI) trust flow, according to some implementations described herein.

FIG. 9 is a diagram of an example Personal Energy Public Key Infrastructure (PEPKI) trust flow 900, according to some implementations described herein. The illustrated PEPKI trust flow 900 includes a trust flow for two billpayers 902 and 904. In an example, the billpayers 902 and 904 may be associated with the ESAG 114 of a premises. In some examples, the billpayer 904 may a household member other than the billpayer 902 that is a co-owner of the data transmitted from the premises. An in-home graphical user interface (GUI) 906 may be used to interact with the billpayers 902 and 904 to provide a license management scheme 908 for the data generated that is associated with the billpayers 902 and 904. For example, the GUI 906 may provide a mechanism for the billpayers 902 and 904 to grant licenses to various entities for use of the data.

The ESAG 114 may assign a personal energy public key infrastructure (PEPKI) root certificate for each of the billpayers 902 and 904. The billpayers 902 and 904 can communicate through a home gateway to generate smart contracts using the PEPKI root certificate that provide data permissions for various entities. In the data plane 122, the data licenses may be communicated to the HDAME permissions 306, and billpayer HDAME data, function, and ledger master certificates may be provided to an Ethereum management cryptographic operation 910.

Figure 10:
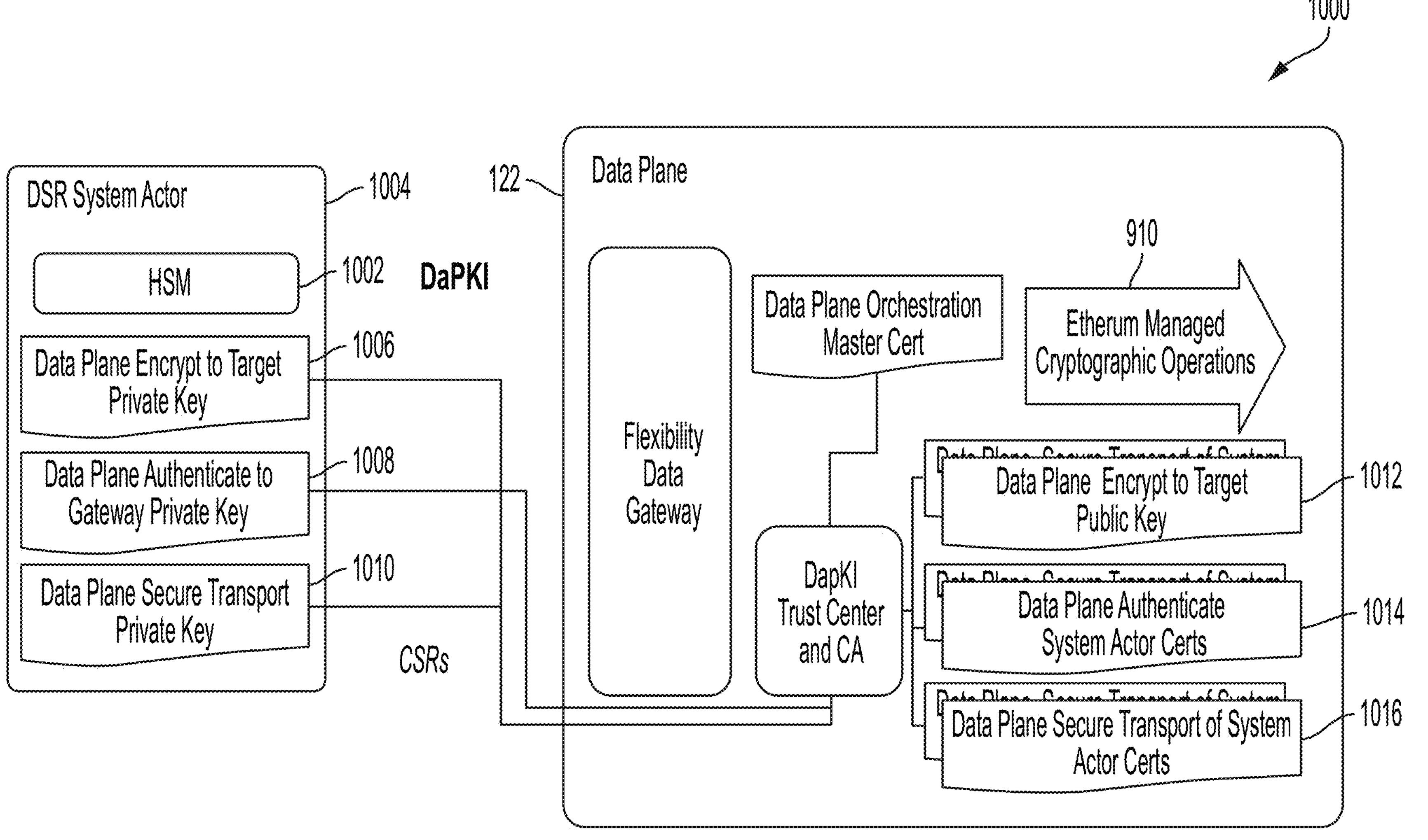
FIG. 10 is a diagram of an example Data Plane Key Infrastructure (DaPKI) trust flow, according to some implementations described herein.

FIG. 10 is a diagram of an example Data Plane Key Infrastructure (DaPKI) trust flow 1000, according to some implementations described herein. In an example, hardware security managers (HSMs) 1002 may be used at the edges of the system by a target actor 1004 (e.g., as described above with respect to FIG. 3). Within the data plane 122, the minimization of the HSMs 1002 to keep costs down and take advantage of efficiencies inherent in public cloud infrastructures may be beneficial. System actors, such as target actors 1004, will rely on keys provisioned to decrypt data. Accordingly, the target actors 1004 may provide private keys 1006, 1008, and 1010 to the data plane 122 to decrypt data. Using the private keys 1006, 1008, and 1010, the public keys 1012, 1014, and 1016 may be generated for use with the Ethereum managed cryptographic operations 910. In this manner, the DaPKI trust flow 1000 enables trustless interaction in the data plane 122 by the target actors 1004.

Processing power from distributed resources throughout the Ethereum network may be used to process the Ethereum managed cryptographic operations 910. This power may be referred to as fuel. Ethereum networks may enable distributed Ethereum nodes to contribute fuel to help make the network secure. These nodes can be located at organizations such as industry participants like retailers, DSOs, DSRSPs, etc. and industry bodies such as Elexon and the Electricity Networks Association. ESAG logical devices may also be used as a source of fuel to contribute to the security of the system.

Figure 11:
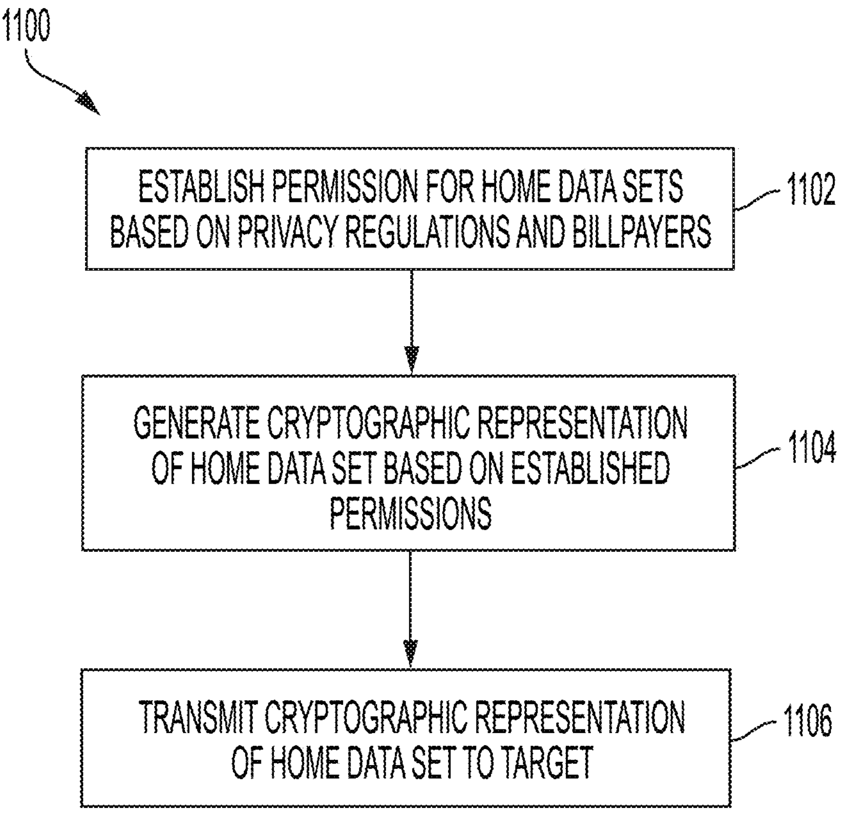
FIG. 11 is a flowchart of a process for establishing trustless messaging for an energy management system, according to some implementations described herein.

FIG. 11 is a flowchart of a process 1100 for establishing trustless messaging for an energy management system, according to some implementations described herein. At block 1102, the process 1100 involves establishing permissions for home data sets. The permissions may be based on privacy regulations and the information that a billpayer has agreed to license for various purposes. For example, the billpayer may license the home data set to various entities for analysis and anomaly detection. The licenses may be recorded using smart contracts, NFTs, and a ledger of an Ethereum network.

At block 1104, the process 1100 involves generating cryptographic representations of the home data sets based on the established permissions. For example, the home data set or portions of the home data set may be encrypted in a manner that is available for access only by entities with permissions or licenses granted by the billpayer.

At block 1106, the process 1100 involves transmitting the cryptographic representation of the home data set to a target with adequate permissions. The target may be a data analysis engine, a CEM manager, an academic or government entity, or any other target that has been granted permissions by the data owner.

Figure 12:
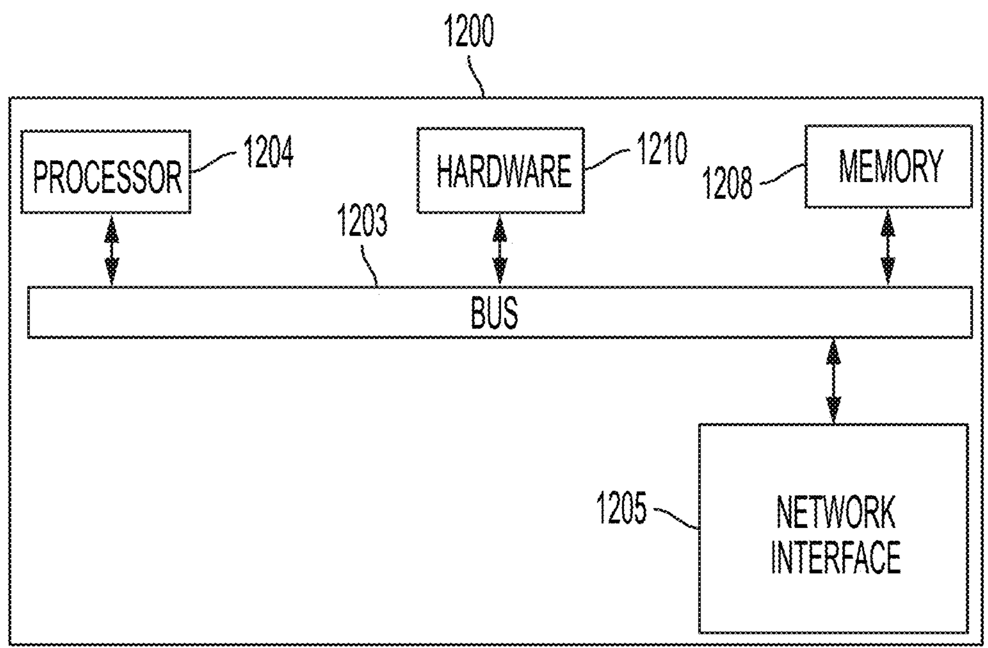
FIG. 12 is a block diagram of an example computing device, according to some implementations described herein.

FIG. 12 is a block diagram of an example computing device 1200, according to some implementations described herein. The computing device 1200 includes a processor 1204 (possibly including multiple processors, multiple cores, multiple nodes, or implementing multi-threading, etc.). The computing device 1200 also includes a memory 1208. The memory 1208 may be system memory (e.g., one or more of cache, SRAM, DRAM, zero capacitor RAM, Twin Transistor RAM, eDRAM, EDO RAM, DDR RAM, EEPROM, NRAM, RRAM, SONO S, PRAM, etc.) or any one or more of the above already described possible realizations of machine-readable media. The computing device 1200 also includes a bus 1203 and a network interface 1205 (e.g., a Fiber Channel interface, an Ethernet interface, an internet small computer system interface, SONET interface, wireless interface, etc.).

Any one of the previously described functionalities may be partially (or entirely) implemented in hardware 1210 or on the processor 1204. For example, the functionality may be implemented with an application specific integrated circuit, in logic implemented in the processor 1204, in a co-processor on a peripheral or card, etc. Further, realizations may include fewer or additional components not illustrated in FIG. 12 (e.g., video cards, audio cards, additional network interfaces, peripheral devices, etc.). The processor 1204 and the network interface 1205 are coupled to the bus 1203. Although illustrated as being coupled to the bus 1203, the memory 1208 may be coupled to the processor 1204.

As will be appreciated, aspects of the present disclosure may be depicted as a system, method or program code/instructions stored in one or more machine-readable media. Accordingly, aspects may take the form of hardware, software (including firmware, resident software, micro-code, etc.), or a combination of software and hardware aspects that may generally be referred to herein as a "circuit", "module" or "system". The functionality presented as individual modules/units in the example illustrations can be organized differently in accordance with any one of platform (operating system or hardware), application ecosystem, interfaces, programmer preferences, programming language, administrator preferences, etc.

Any combination of one or more machine readable medium(s) may be utilized as the memory 1208. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include propagated data signal with machine-readable program code depicted therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code depicted on a machine-readable medium may be transmitted using an appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as Java® programming language, C++ or the like; a dynamic programming language such as Python; a scripting language such as Perl programming language or PowerShell script language; and conventional procedural programming languages, such as the "C" programming language or similar programming languages. The program code may execute in a distributed manner across multiple machines and may execute on one machine while providing results or accepting input on another machine.

Plural instances may be provided for components, operations or structures described herein as a single instance. Particular operations are illustrated in the context of specific illustrative examples. Other allocations of functionality are envisioned and may fall within the scope of the disclosure. Use of the phrase "at least one of" preceding a list with the conjunction "and" should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Numerous specific details are set forth herein to provide a thorough understanding of the claimed subject matter. However, those skilled in the art will understand that the claimed subject matter may be practiced without these specific details. The features discussed herein are not limited to any particular hardware architecture or configuration. A utility meter can include any suitable arrangement of components that behave as described herein. Any suitable programming, scripting, or other type of language or combinations of languages may be used to implement the teachings contained herein in software to be used in programming or configuring a utility meter or other device. Methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, or additions to the present subject matter as would be readily apparent to one of ordinary skill in the art.

What is claimed is:

1. A system comprising:

a processor; and a non-transitory, computer-readable memory that includes instructions executable by the processor for causing the processor to:

access data communications associated with energy consumption from premises data sources located at a premises;

generate a premises data set using the data communications associated with the energy consumption, wherein the premises data set contains premises-level data;

wrap the premises data set with a set of permissions using a privacy management operation;

receive a request from an entity to access the premises data set;

determine that the entity is permitted to access the premises data set based on the set of permissions;

provide the premises data set to the entity;

access additional data communications associated with an additional energy consumption from additional premises data sources located at an additional premises, wherein an additional premises data set contains premises-level data;

generate the additional premises data set using the additional data communications associated with the additional premises;

aggregate the premises data set and the additional premises data set to generate an aggregated data set;

perform anomaly detection and data analysis on the premises data set of the premises to generate an updated premises data set;

perform anomaly detection and data analysis on the additional premises data set of the additional premises to generate an additional updated premises data set; and perform anomaly detection and data analysis on the aggregated data set to generate an updated aggregated data set, wherein performing anomaly detection on the premises data set comprises identifying conflicting signals to separate energy consumption devices within the premises.

2. The system of claim 1, wherein the instructions are further executable by the processor for causing the processor to:

provide the updated premises data set and the additional updated premises data set to an energy management system that is configured to mitigate a detected anomaly indicated by the updated premises data set and the additional updated premises data set.

3. The system of claim 1, wherein the entity comprises a controller in a control plane of the premises.

4. The system of claim 3, wherein the entity is configured transmit control instructions to the premises data sources in response to the premises data set.

5. The system of claim 1, wherein the set of permissions are established by recording smart contracts and non-fungible tokens in a blockchain ledger.

6. The system of claim 1, wherein the premises data sources comprise energy smart appliances, electric vehicle supply equipment, smart metering devices, or a combination thereof.

7. The system of claim 1, wherein at least one permission of the set of permissions enables a mobility service provider to access data generated by electric vehicle supply equipment of the premises.

8. The system of claim 1, wherein the data communications are accessed using a flexibility data gateway of a data plane to communicate trustlessly with the premises data sources.

9. The system of claim 1, wherein the set of permissions are transferrable upon a change of tenancy to a new tenant of the premises.

10. A non-transitory, computer-readable medium comprising instructions that are executable by a processor for causing the processor to perform operations comprising:

accessing data communications associated with energy consumption from premises data sources located at a premises;

generating a premises data set using the data communication associated with the energy consumption, wherein the premises data set contains premises-level data;

wrapping the premises data set with a set of permissions using a privacy management operation;

receiving a request from an entity to access the premises data set;

determining that the entity is permitted to access the premises data set based on the set of permissions;

providing the premises data set to the entity;

accessing additional data communications associated with an additional energy consumption from additional premises data sources located at an additional premises, wherein an additional premises data set contains premises-level data;

generating the additional premises data set using the additional data communications associated with the additional premises;

aggregating the premises data set and the additional premises data set to generate an aggregated data set;

performing anomaly detection and data analysis on the premises data set of the premises to generate an updated premises data set;

performing anomaly detection and data analysis on the additional premises data set of the additional premises to generate an additional updated premises data set; and performing anomaly detection and data analysis on the aggregated data set to generate an updated aggregated data set, wherein performing anomaly detection on the premises data set comprises identifying conflicting signals to separate energy consumption devices within the premises.

11. The non-transitory, computer-readable medium of claim 10, wherein the operations further include:

providing the updated premises data set and the additional updated premises data set to an energy management system that is configured to mitigate a detected anomaly indicated by the updated premises data set and the additional updated premises data set.

12. The non-transitory, computer-readable medium of claim 10, wherein the entity comprises a controller in a control plane of the premises, and the entity is configured transmit control instructions to the premises data sources in response to the premises data set.

13. The non-transitory, computer-readable medium of claim 10, wherein the set of permissions are established by recording smart contracts and non-fungible tokens in a blockchain ledger.

14. The non-transitory, computer-readable medium of claim 10, wherein the data communications are accessed using a flexibility data gateway of a data plane to communicate trustlessly with the premises data sources.

15. A computer-implemented method comprising:

accessing, at a demand side response data plane, data communications associated with energy consumption from premises data sources located at a premises;

generating, at the demand side response data plane, a premises data set using the data communication associated with the energy consumption, wherein the premises data set contains premises-level data;

wrapping, at the demand side response data plane, the premises data set with a set of permissions using a privacy management operation;

receiving, at the demand side response data plane, a request from an entity to access the premises data set;

determining, at the demand side response data plane, that the entity is permitted to access the premises data set based on the set of permissions;

providing, from the demand side response data plane, the premises data set to the entity;

accessing, at the demand side response data plane, additional data communications associated with an additional energy consumption from additional premises data sources located at an additional premises;

generating, at the demand side response data plane, an additional premises data set using the additional data communications associated with the additional premises, wherein the additional premises data set contains premises-level data;

aggregating at the demand side response data plane, the premises data set and the additional premises data set to generated an aggregated data set;

performing, at the demand side response data plane, anomaly detection and data analysis on the premises data set of the premises to generate an updated premises data set; and performing, at the demand side response data plane, anomaly detection and data analysis on the additional premises data set of the additional premises to generate an additional updated premises data set; and performing at the demand side response data plane, anomaly detection and data analysis on the aggregated data set to generate an updated aggregated data set, wherein performing anomaly detection on the premises data set comprises identifying conflicting signals to separate energy consumption devices within the premises.

16. The computer-implemented method of claim 15, further comprising:

providing, by the demand side response data plane, the updated premises data set and the additional updated premises data set to an energy management system that is configured to mitigate a detected anomaly indicated by the updated premises data set and the additional updated premises data set.

17. The computer-implemented method of claim 15, wherein the premises data sources comprise energy smart appliances, electric vehicle supply equipment, smart metering devices, or a combination thereof.

18. The computer-implemented method of claim 15, wherein at least one permission of the set of permissions enables a mobility service provider to access data generated by electric vehicle supply equipment of the premises.

19. The computer-implemented method of claim 15, wherein the data communications are accessed using a flexibility data gateway of a data plane to communicate trustlessly with the premises data sources.

* * * * *